United States Patent
Katayama

(10) Patent No.: US 11,687,299 B2
(45) Date of Patent: Jun. 27, 2023

(54) IMAGE PROCESSING APPARATUS WITH SELF-DETERMINATION OF COMMUNICATION CAPABILITY WITH A SERVER, AND IMAGE PROCESSING SYSTEM, IMAGE PROCESSING METHOD, AND STORAGE MEDIUM THEREOF

(71) Applicant: CANON KABUSHIKI KAISHA, Tokyo (JP)

(72) Inventor: Soichiro Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/397,776

(22) Filed: Aug. 9, 2021

(65) Prior Publication Data

US 2022/0050648 A1    Feb. 17, 2022

(30) Foreign Application Priority Data

Aug. 11, 2020    (JP) .................................. 2020-135742

(51) Int. Cl.
*G06F 3/12* (2006.01)
(52) U.S. Cl.
CPC .......... *G06F 3/1239* (2013.01); *G06F 3/1204* (2013.01); *G06F 3/1231* (2013.01); *G06F 3/1236* (2013.01); *G06F 3/1273* (2013.01)

(58) Field of Classification Search
CPC .... G06F 3/1239; G06F 3/1204; G06F 3/1231; G06F 3/1236; G06F 3/1273
USPC ............................... 358/1.15, 1.14, 1.13, 1.1
See application file for complete search history.

(56) References Cited

U.S. PATENT DOCUMENTS

| | | | |
|---|---|---|---|
| 10,684,809 B2 * | 6/2020 | Watanabe | G06F 3/1203 |
| 10,802,779 B2 * | 10/2020 | Kitagata | G06F 3/1241 |
| 2018/0101336 A1 | 4/2018 | Onomatsu | |

FOREIGN PATENT DOCUMENTS

JP    2018-058312    4/2018

* cited by examiner

*Primary Examiner* — Lennin R Rodriguezgonzalez
(74) *Attorney, Agent, or Firm* — Venable LLP

(57) ABSTRACT

Provided is an an image processing apparatus, an image processing system, an image processing method, and a storage medium that can suppress a reduction in the processing speed. To this end, whether the connection state between a printer and a server is online is determined by confirming the connection state between the printer and a relay device and whether there is an un-transmitted operation log.

16 Claims, 5 Drawing Sheets

IMAGE PROCESSING APPARATUS WITH SELF-DETERMINATION OF COMMUNICATION CAPABILITY WITH A SERVER, AND IMAGE PROCESSING SYSTEM, IMAGE PROCESSING METHOD, AND STORAGE MEDIUM THEREOF

BACKGROUND

Field

The present disclosure relates to an image processing system and in particular to an image processing apparatus, an image processing system, an image processing method, and a storage medium that determine a connection situation between the image processing apparatus and a server.

Description of the Related Art

Japanese Patent Laid-Open No. 2018-58312 discloses that printing is executed with an amount of printing determined based on either one of information on an upper limit of the number of printed sheets that can be printed without communicating with a server, which information is stored in a storage unit of a printer, and printing permission information obtained from communication with the server. There is described that, with the above configuration, it is possible to execute printing without taking time even in a case where the speed of communication between the printer and the server is low.

However, in a case where the printer communicates with the server during printing so as to obtain the printing permission information, the response takes time depending on the line condition of the network and the condition of the server, and this may result in a risk of a reduction in the printing speed.

SUMMARY

Therefore, the present disclosure provides an image processing apparatus, an image processing system, an image processing method, and a storage medium that can suppress a reduction in the processing speed.

Thus, an image processing apparatus of the present disclosure is an image processing apparatus that is communicable with a server, including: a storage unit that stores an operation log indicating operation history of the image processing apparatus; a transmission unit that transmits the operation log stored in the storage unit and delete an operation log that is transmitted successfully from the storage unit; and a determination unit that executes determination processing for determining whether it is possible to communicate with the server while printing processing is executed, in which the determination processing is executed based on information held in the image processing apparatus.

According to the present disclosure, it is possible to provide an image processing apparatus, an image processing system, an image processing method, and a storage medium that can suppress a reduction in the processing speed.

Further features of the present disclosure will become apparent from the following description of exemplary embodiments with reference to the attached drawings.

DESCRIPTION OF THE EMBODIMENTS

Hereinafter, an embodiment of the present disclosure is described with reference to the drawings.

Figure 1:
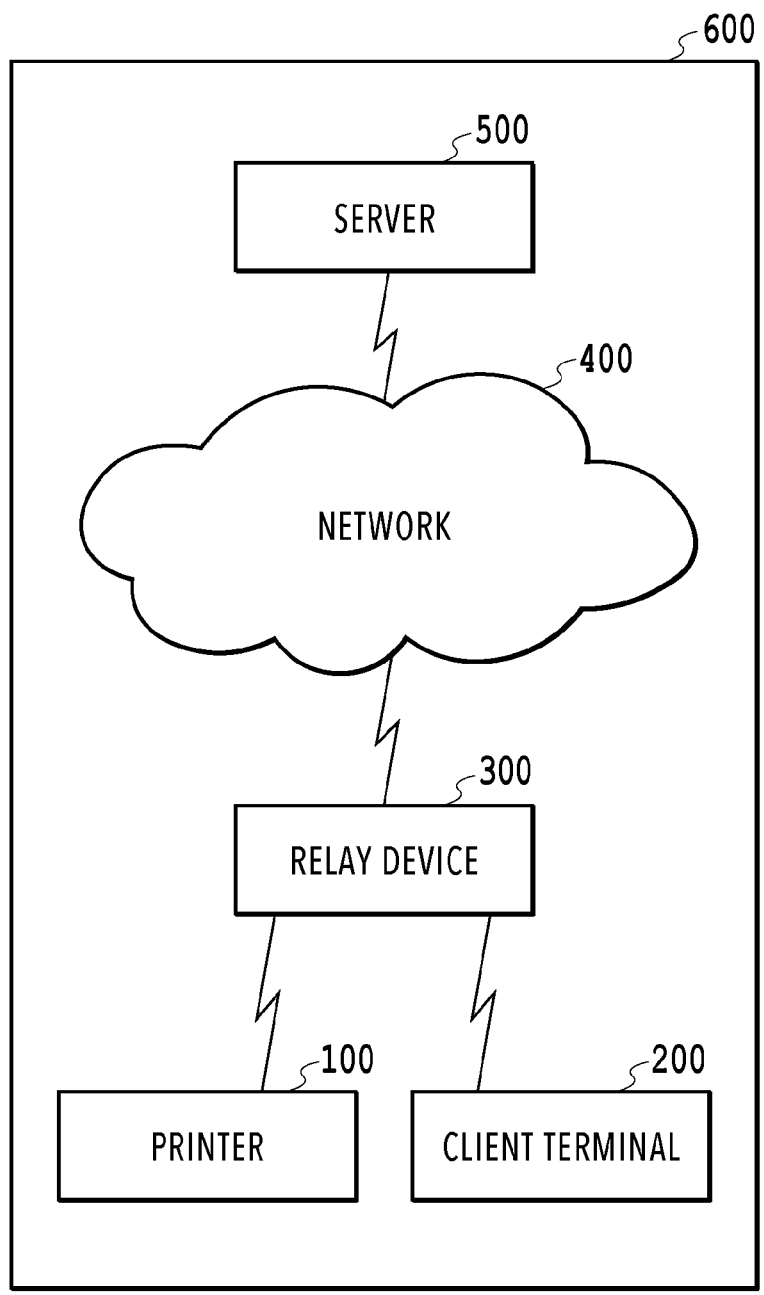
FIG. 1 is a diagram illustrating a configuration of an image processing system.

FIG. 1 is a diagram illustrating a configuration of an image processing system 600 to which the present disclosure is applicable. The image processing system 600 includes a relay device 300 that connects a printer 100 and a network 400 with each other, and a server 500 that collects operation logs of the printer 100. Once the printer 100 is connected to the network 400 through the relay device 300, the printer 100 is registered on the server 500. With the printer 100 registered on the server 500, the printer 100 and the server 500 become intercommunicable with each other.

The relay device 300 automatically allocates an IP address to a connected device. Accordingly, an IP address is allocated to the printer 100 automatically with the printer 100 connected with the relay device 300. The relay device 300 may be a device or the like such as a wireless LAN router, for example. An expiration date is set for the IP address allocated by the relay device 300. An IP address having an expired expiration date is released from the printer 100. In a case where update of the IP address is requested by the printer 100 within the expiration date, the relay device 300 updates the expiration date of the IP address allocated to the printer 100. The printer 100 stores operations during activation and during execution of printing as the operation logs. The stored operation logs are transmitted to the server 500 through the relay device 300 and the network 400.

An operation log that is not transmitted is stored as an un-transmitted operation log. An operation log that is transmitted completely is deleted from the printer 100. For example, the server 500 can execute automatic delivery processing for consumable supplies based on the operation log transmitted from the printer 100 and the like. For example, in a case where the server 500 determines that the remaining amount of ink is smaller than a predetermined value based on the operation log, the ink may be automatically transmitted to a user of the printer 100. The consumable supplies are not limited to ink but also printing paper.

Figure 2:
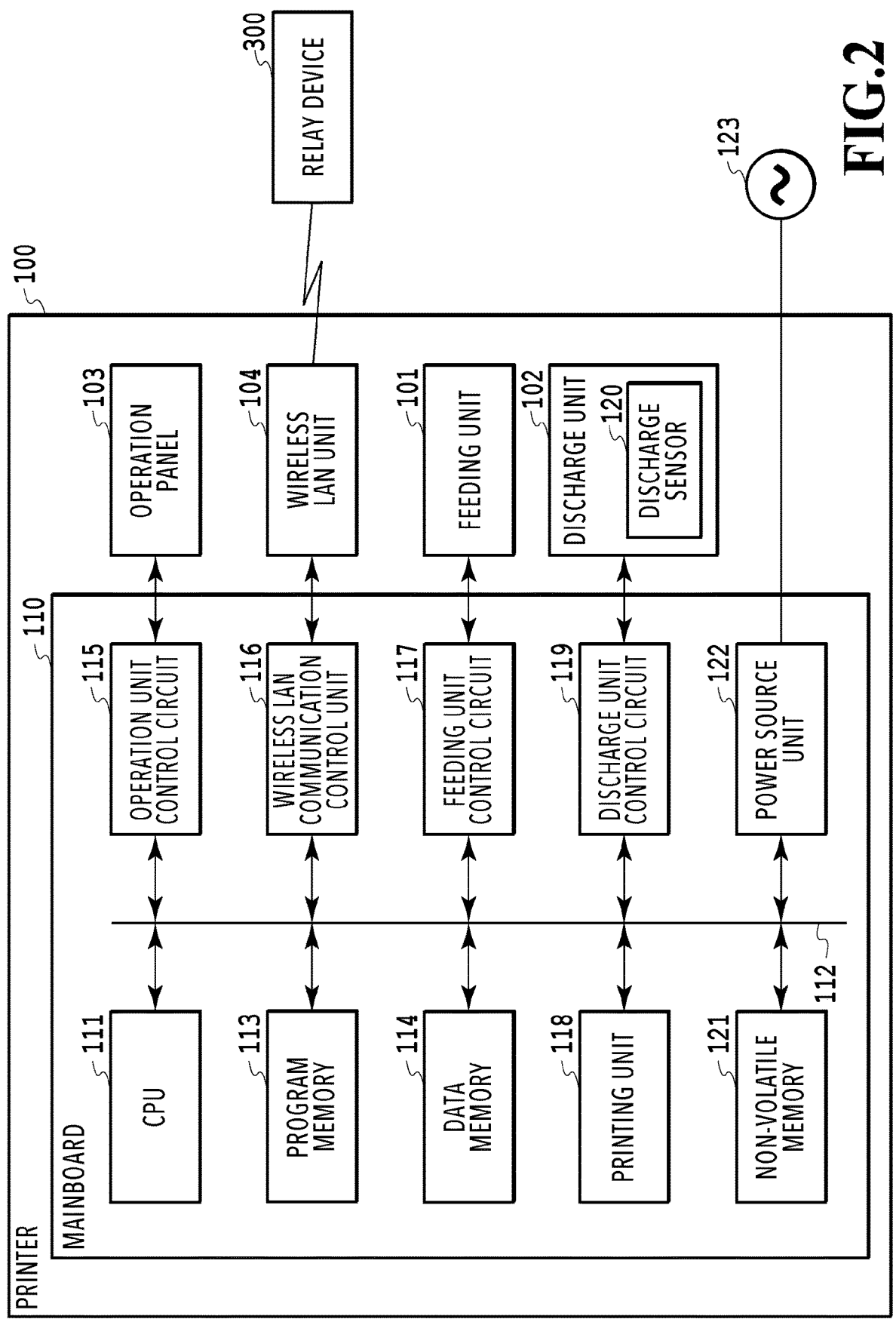
FIG. 2 is a diagram illustrating a configuration of an image processing system of a printer connected with a relay device.

FIG. 2 is a diagram illustrating a configuration of the printer 100 connected with the relay device 300. The printer 100 includes a mainboard 110 that controls overall the apparatus, a feeding unit 101, a discharge unit 102, an operation panel 103, and a wireless LAN unit 104. A CPU 111 in the form of a microprocessor arranged on the mainboard 110 is operated according to a control program stored in a program memory 113 in the form of a ROM connected with the CPU 111 through an internal bus 112 and the contents of a data memory 114 in the form of a RAM. The CPU 111 can control an operation unit control circuit 115 to display a state of the printer 100 and display a function selection menu onto the operation panel 103 and to accept an operation from the user.

The CPU 111 can communicate with the server through the relay device 300 and the communication network 400 by controlling the wireless LAN unit 104 through a wireless LAN communication control unit 116. The CPU 111 controls a feeding unit control circuit 117 to feed paper from the feeding unit 101 and to convey the paper to a printing unit 118. The CPU 111 controls the printing unit 118 to print an image on the paper conveyed from the feeding unit 101. The CPU 111 controls a discharge unit control circuit 119 to take in the paper from the printing unit 118 and to convey the paper to the discharge unit 102.

A discharge sensor 120 is mounted in the discharge unit 102 and detects the state of the paper being discharged. A non-volatile memory 121 includes a flash memory and the like and stores data desired to be saved also after the power is turned off. A power source unit 122 is connected with an alternating-current commercial power source 123 and supplies the printer 100 with power.

Figure 3:
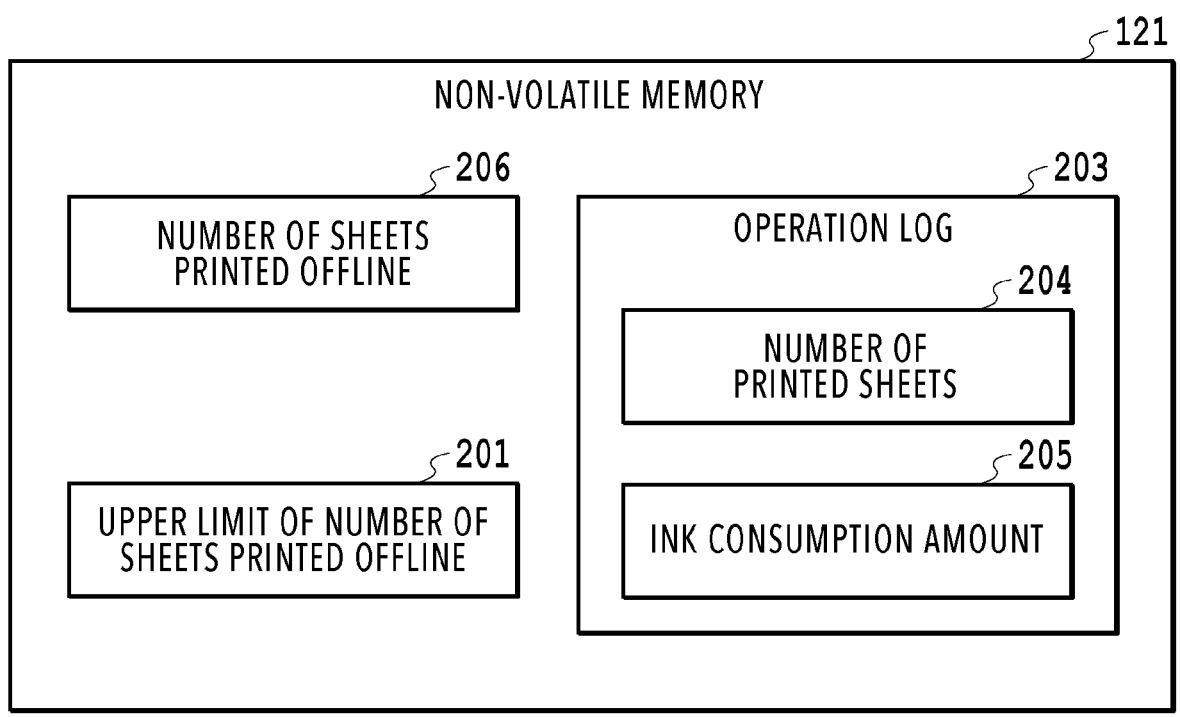
FIG. 3 is a diagram illustrating a configuration of a non-volatile memory.

FIG. 3 is a diagram illustrating a configuration of the non-volatile memory 121. The non-volatile memory 121 stores the number of sheets printed offline (the number of processing) 206, an upper limit of the number of sheets printed offline (an upper limit of the number of processing) 201, and an operation log 203. The number of sheets printed offline 206 stores the number of printed sheets that are printed in a state where the printer 100 cannot communicate with the server 500. The upper limit of the number of sheets printed offline 201 stores the upper limit of the number of printed sheets that are printed in the state where the printer 100 cannot communicate with the server 500. The operation log 203 is operation history of the printer 100. For example, the operation log 203 includes the number of printed sheets 204 used in a printing job as a processing target, the type of the printing job (maintenance job or normal printing job), and a consumption amount of consumable supplies such as an ink consumption amount 205.

Figure 4:
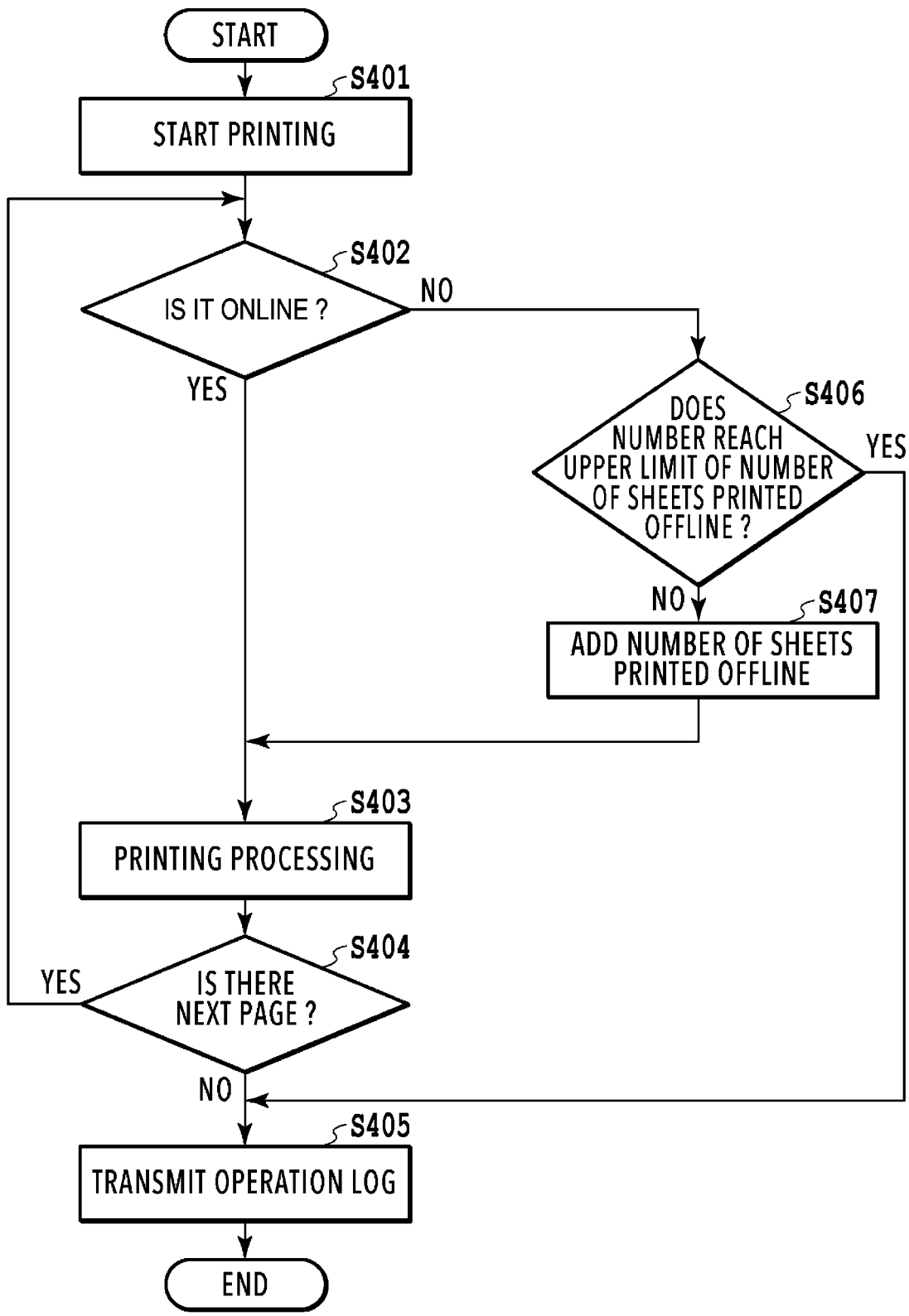
FIG. 4 is a flowchart illustrating printing processing in the printer.

FIG. 4 is a flowchart illustrating printing processing in the printer 100. Hereinafter, printing processing in this embodiment is described with reference to this flowchart. A series of processing illustrated in FIG. 4 is performed with the CPU 111 of the printer 100 deploying and executing a program code stored in the program memory 113 on the data memory 114. Alternately, a part of or all the functions of the steps in FIG. 4 may be implemented by hardware such as an ASIC or an electronic circuit. The sign "S" in each description for the processing means that it is a step in the flowchart.

In S401, once the user instructs the printer 100 to start the printing processing from a client terminal 200, the CPU 111 receives a job transmitted from the client terminal 200. Thereafter, in S402, the CPU 111 determines the network connection state of the printer 100. Details of the determination processing in S402 are described with reference to a flowchart in FIG. 5 described later. In the determination in S402, if it is determined as online determination (Y), the processing of the CPU 111 proceeds to S403, and if it is offline determination (N), the processing proceeds to S406.

In the case where the processing proceeds to S403, the CPU 111 prints one page by the printing unit 118. That is, in the case where it is determined as the online determination, execution of the predetermined processing (printing processing) started in S401 is permitted, and the printing processing is performed. Thereafter, in S404, the CPU 111 determines whether there is a next page to be printed. If there is a next page (Y), the processing of the CPU 111 returns to S402, and the processing is repeated. If there is no next page (N), the processing of the CPU 111 proceeds to S405. The printing processing in S403 that is executed if it is determined as Yes in S402 is printing performed in the online state. Therefore, in the case where it is determined as Yes in S402, none of later-described determination processing in S406 or processing of adding the number of sheets printed offline 206 in S407 is performed.

In the case where the processing proceeds from S402 to S406, the CPU 111 refers to the non-volatile memory 121 and determines whether the number of printed sheets that are printed offline reaches the upper limit. If the number of printed sheets does not reach the upper limit (N), the processing proceeds to S407, and one is added to the number of sheets printed offline 206 in the non-volatile memory 121. Thereafter, the CPU 111 proceeds to S403. If the number of printed sheets reaches the upper limit (Y), the CPU 111 proceeds to S405.

In the case where the CPU 111 proceeds to S405, transmission processing for transmitting the operation log 203 to the server 500 is preformed, and the printing processing is terminated. If the transmission of the operation log 203 to the server 500 is succeeded, the operation log 203 is deleted from the non-volatile memory 121. On the other hand, if the printer 100 fails to transmit the operation log 203 offline, information on the operation log 203 remains in the printer 100 as an un-transmitted operation log 203. In a case where a video log is transmitted in S405, the CPU 111 transmits a transmission request to the server 500. In this case, if receiving a response to the transmission request from the server 500, the CPU 111 transmits the operation log 203.

On the other hand, if the CPU 111 cannot receive the response to the transmission request from the server 500, the operation log 203 remains in the non-volatile memory 121. The processing in S405 may be performed in a different timing. For example, if it is determined as No in S404, the state of the printer 100 is changed from the printing state to an idling state. If the CPU 111 cannot receive the response from the server 500 in this idling state, the operation log 203 remains in the non-volatile memory 121. Additionally, for example, the processing in S405 may be individually executed when activating the printing apparatus on the next day. In this case, if the CPU 111 can receive the response to the transmission request from the server 500, the operation log 203 remaining in the non-volatile memory 121 is transmitted. That is, the communication determination processing for determining whether it is possible to communicate with the server by executing the communication processing with the server is performed when the printing processing is terminated or when the printer 100 is activated.

For example, the printer 100 may perform the processing in FIG. 4 in a case where an automatic delivery mode for consumable supplies is validated in the printer 100 (or in a case where the transmission of the operation log is permitted). On the other hand, if the automatic delivery mode is invalidated, the CPU 111 may execute only S401, S403, and S405. Additionally, switching of validation and invalidation of the automatic delivery mode may be performed by using an operation panel of the printer 100, or it may be switched under instructions from the server 500.

In this embodiment, in order to determine the network connection state of the printer 100, the connection state is estimated by confirming the connection state between the printer 100 and the relay device 300 and whether there is the un-transmitted operation log 203, and thus whether the printer 100 is online is determined. The connection state between the printer 100 and the relay device 300 can be determined based on whether an IP address is allocated to the printer 100, for example.

That is, if an IP address is allocated to the printer 100, it is possible to estimate that the printer 100 is connected with the relay device 300 and is also connected with the server 500 through the relay device 300. Additionally, if there is no un-transmitted operation log 203, it is possible to estimate that the operation log 203 is transmitted to the server 500 and accordingly the printer 100 is connected with the server 500. Thus, in this embodiment, it is possible to determine whether the connection state between the printer 100 and the server 500 is online without making the communication between the printer 100 and the server 500. A method of determining the network connection state of the printer 100 is described below.

Figure 5:
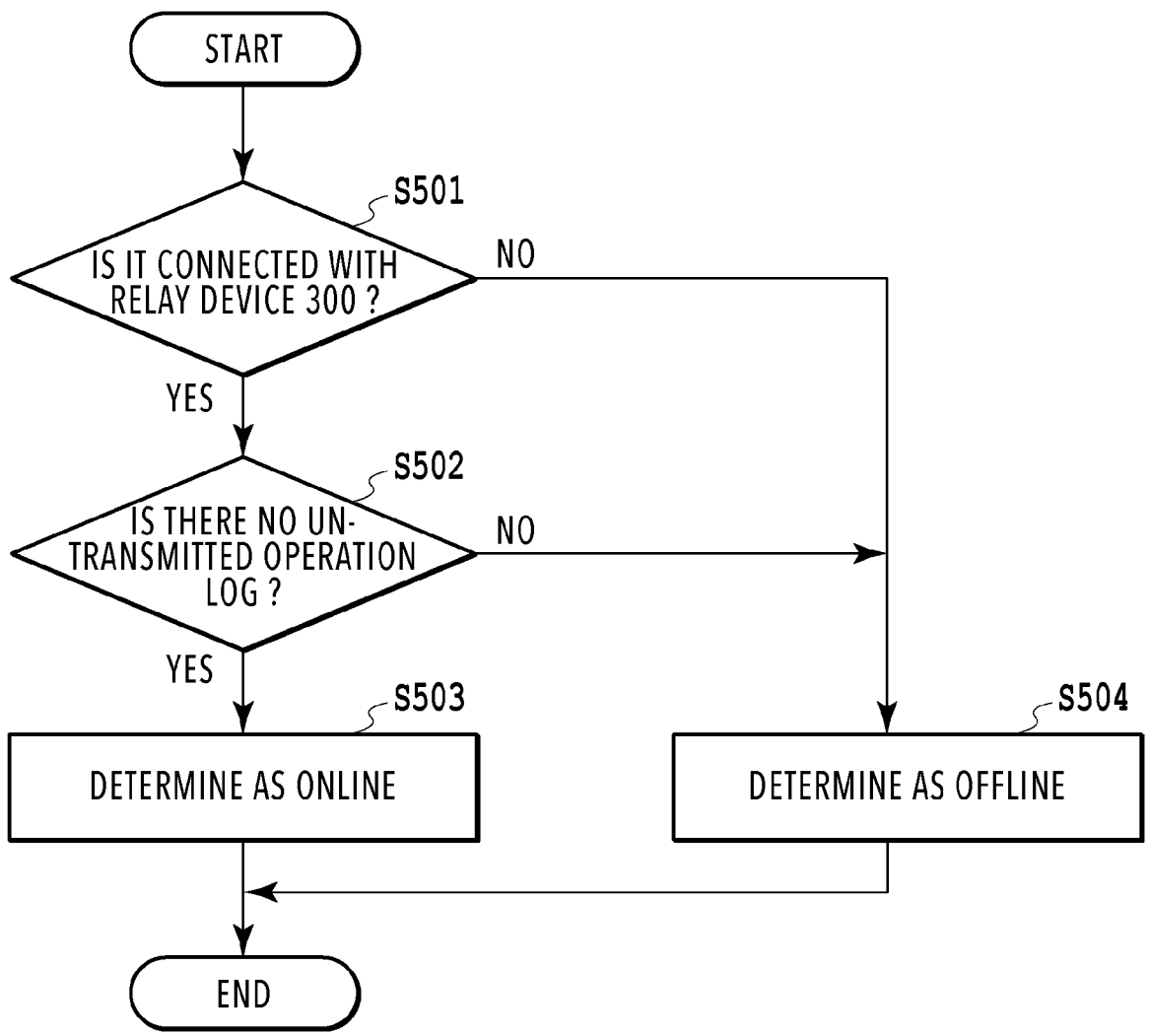
FIG. 5 is a flowchart illustrating processing in S402 in FIG. 4.

FIG. 5 is a flowchart illustrating the processing in S402 in FIG. 4. S402 (FIG. 5) is processing for determining whether it is possible to communicate with the server 500 while the printing processing is executed. Hereinafter, the determination processing of the network connection state in this embodiment is described with reference to this flowchart.

Once the determination processing of the network connection state is started, in S501, the CPU 111 determines whether the wireless LAN unit 104 is connected with the relay device 300 and whether an IP address is allocated to the printer 100. If an IP address is allocated to the printer 100 (Y), the processing of the CPU 111 proceeds to S502, and it is determined whether the non-volatile memory 121 includes the operation log 203 not transmitted to the server 500. If there is no operation log 203 (Y), the CPU 111 in S503 determines that the network connection state is online, and the processing is terminated.

If no IP address is allocated to the printer 100 in S501 (N), or if there is the un-transmitted operation log 203 in S502 (N), the processing of the CPU 111 proceeds to S504, it is determined that the network connection state is offline, and the processing is terminated. In this embodiment, offline corresponds to a situation where it is impossible to communicate with the server 500, and online corresponds to a situation where it is possible to communicate with the server 500.

As described above, it is determined whether the connection state between the printer 100 and the server 500 is online by confirming the connection state between the printer 100 and the relay device 300 and whether there is the un-transmitted operation log 203. The processing of determination using an IP address in S501 is an example, and other processing may be applied to make the determination. For example, the determination in S501 may be performed based on whether a service set identifier (SSID) is set in the printer 100.

Here, the reason why the determination is made by using only the information held in the printer 100 without using the response from the server 500 in the determination processing in S402 (that is, FIG. 5). For example, the determination in S402 is performed while the printing processing of a second page is performed after the printing processing of a first page. If the determination processing using the response to the transmission request in such a timing, the CPU 111 cannot print the second page until receiving the response from the server 500, and this results in a risk of a reduction in the printing processing efficiency. On the other hand, since the determination can be made without communication with the server 500 by performing in S402 the determination processing as described in FIG. 5, it is possible to reduce the occurrence of the above-described problems.

Therefore, it is possible to provide an image processing apparatus, an image processing system, an image processing method, and a storage medium that can suppress a reduction in the processing speed.

In this embodiment, an example using a printer is described; however, the present disclosure is not limited to a printer and is applicable to an apparatus that performs predetermined image processing such as a reading apparatus that reads an image.

Other Embodiments

Hereinafter, other embodiments of the present disclosure are described. Since the basic configurations of these embodiments are similar to that of the first embodiment, characteristic configurations are described hereinafter.

In the above-described embodiment, it is described that the connection state with the server 500 is determined during the printing operation of the printer 100. However, the determination may be used for the connection state confirmation when the printer 100 is activated or idling.

Additionally, a clock time of the last time when the transmission of the operation log is succeeded may be stored in the non-volatile memory 121, and the determination on the connection state may be performed under condition that it is determined as online from the clock time of the transmission success until a predetermined period of time is passed.

Moreover, the present disclosure may be applied to an image processing system in which the server manages the service with a charge set according to the number of printed sheets and a consumption amount of consumable supplies such as an ink consumption amount.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-135742 filed Aug. 11, 2020, which is hereby incorporated by reference wherein in its entirety.

What is claimed is:

1. An image processing apparatus that is communicable with a server and is configured to execute printing processing, comprising:
    a storage unit that stores information including an operation log indicating operation history of the image processing apparatus;
    a transmission unit that transmits the operation log stored in the storage unit and delete an operation log that is transmitted successfully from the storage unit; and
    a determination unit that executes determination processing for determining whether it is possible to communicate with the server while printing processing is executed, wherein
    the determination processing is executed based on the information held in the storage unit.

2. The image processing apparatus according to claim 1, wherein
    the determination unit determines that it is impossible to communicate with the server if no IP address is allocated to the image processing apparatus or if the operation log is stored in the storage unit.

3. The image processing apparatus according to claim 1, further comprising:
    a processing unit that performs printing processing on a medium, wherein
    the storage unit further stores the number of processing of printing performed in a situation where it is impossible to communicate with the server and an upper limit of the number of processing in the situation where it is impossible to communicate with the server, and
    the processing unit executes the printing processing if the number of processing does not reach the upper limit of the number of processing.

4. The image processing apparatus according to claim 3, wherein
    the operation log includes the number of processing in the processing unit and a consumption amount of consumable supplies.

5. The image processing apparatus according to claim 1, wherein
    the determination unit executes communication determination processing for determining whether it is possible to communicate with the server by executing communication processing with the server when the printing processing is terminated or when the image processing apparatus is activated.

6. The image processing apparatus according to claim 1, wherein
    the storage unit stores a clock time of the last time when the transmission unit transmits the operation log, and
    the determination unit determines that the connection state with the server is online from the clock time to a predetermined clock time.

7. The image processing apparatus according to claim 1, wherein
    the determination processing is executed without communicating with the server.

8. An image processing system, comprising:
    an image processing apparatus that includes a storage unit that stores an operation log indicating operation history of the image processing apparatus and a transmission unit that transmits the operation log stored in the storage unit and delete an operation log that is transmitted successfully from the storage unit; and
    a server that is connected with the image processing apparatus through a network by way of a relay device that allocates an IP address to a connected device, wherein
    the image processing apparatus further includes a determination unit that determines that the connection state with the server is online if an IP address is allocated to the image processing apparatus while no operation log is stored in the storage unit and a permission unit that permits predetermined processing if the connection state with the server is online.

9. An image processing method, comprising:
    storing an operation log indicating operation history of the image processing apparatus in a storage unit;
    transmitting the operation log stored in the storing and deleting an operation log transmitted successfully from the storage unit; and
    connecting with a server through a network by way of a relay device that allocates an IP address to a connected device, further comprising:
    determining that the connection state with the server is online if an IP address is allocated to the image processing apparatus while no operation log is stored in the storage unit; and
    permitting predetermined processing if the connection state with the server is online.

10. A non-transitory computer-readable storage medium that stores a program that functions a computer as a unit of an image processing apparatus that is communicable with a server and is configured to execute printing processing, comprising:
    a storage unit that stores information including an operation log indicating operation history of the image processing apparatus;
    a transmission unit that transmits the operation log stored in the storage unit and delete an operation log that is transmitted successfully from the storage unit; and
    a determination unit that executes determination processing for determining whether it is possible to communicate with the server while printing processing is executed, wherein
    the determination processing is executed based on the information held in the storage unit.

11. The non-transitory computer-readable storage medium according to claim 10, wherein
    the determination unit determines that it is impossible to communicate with the server if no IP address is allocated to the image processing apparatus or if the operation log is stored in the storage unit.

12. The non-transitory computer-readable storage medium according to claim 10, further comprising:
    a processing unit that performs printing processing on a medium, wherein
    the storage unit further stores the number of processing of printing performed in a situation where it is impossible to communicate with the server and an upper limit of the number of processing in the situation where it is impossible to communicate with the server, and
    the processing unit executes the printing processing if the number of processing does not reach the upper limit of the number of processing.

13. The non-transitory computer-readable storage medium according to claim 12, wherein
    the operation log includes the number of processing in the processing unit and a consumption amount of consumable supplies.

14. The non-transitory computer-readable storage medium according to claim 10, wherein
the determination unit executes communication determination processing for determining whether it is possible to communicate with the server by executing communication processing with the server when the printing processing is terminated or when the image processing apparatus is activated.

15. The non-transitory computer-readable storage medium according to claim 10, wherein
the storage unit stores a clock time of the last time when the transmission unit transmits the operation log, and
the determination unit determines that the connection state with the server is online from the clock time to a predetermined clock time.

16. The non-transitory computer-readable storage medium according to claim 10, wherein
the determination processing is executed without communicating with the server.

* * * * *